United States Patent [19]
Emmerink et al.

[11] Patent Number: 5,815,161
[45] Date of Patent: Sep. 29, 1998

[54] SYSTEM FOR JOINING ELEMENTS TO COMPLEX JUNCTIONS AND LINKS IN ROAD NETWORK REPRESENTATION FOR VEHICLES

[75] Inventors: Carla J. M. Emmerink, Eindhoven; Hendrik H. Veenker, Emmercompascuum, both of Netherlands

[73] Assignee: U.S. Philips Corporation, New York, N.Y.

[21] Appl. No.: 662,187

[22] Filed: Jun. 12, 1996

[30] Foreign Application Priority Data

Jun. 16, 1995 [EP] European Pat. Off. .............. 95201619

[51] Int. Cl.$^6$ ..................................................... G06T 5/00
[52] U.S. Cl. .............................................................. 345/440
[58] Field of Search .................................... 395/140–142; 345/427, 428, 429, 430, 433, 435, 439, 440, 441–443, 348, 349, 356–358

[56] References Cited

U.S. PATENT DOCUMENTS

| | | | |
|---|---|---|---|
| 4,914,605 | 4/1990 | Loughmiller, Jr. et al. | 345/432 |
| 4,954,986 | 9/1990 | Driessen et al. | 365/189.01 |
| 4,962,458 | 10/1990 | Verstraete | 701/200 |
| 5,515,283 | 5/1996 | Desai et al. | 364/447 |

OTHER PUBLICATIONS

Emmerink et al., "Route Planning & Route Guidance in the Philips In–Car Navigation System CARIN™", Proc. of the First World Congress on Applications of Transport Telematics & Intelligent Vehicle Highway Systems, vol. 1, pp. 240–248, 1995.

Thoone, "CARIN, a car information and navigation system", Philips Technical Review, vol. 43, No. 11/12, Dec. 1987, pp. 317–329.

*Primary Examiner*—Almis R. Jankus
*Attorney, Agent, or Firm*—Arthur Schaier

[57] ABSTRACT

Road data is stored in hierarchically organized levels. A lower level has detailed representations of road links and junctions. At a globalized level an abstracted representation is derived: a set of elementary junctions is joined to a complex junction on the basis of predetermined coherencies among the elements of the set. This repeats until all complex junctions have been found. All external road links between a border element of a particular set and any element of a particular neighboring set are detected, including allowed traffic directions on the external road links. The links are collected to a single complex road link while mapping the allowed traffic directions thereon. This repeats until all complex road links have been found. Remaining elementary and complex junction are represented by a respective single node. Also, each remaining elementary and complex road link is represented by a single higher level road link.

18 Claims, 5 Drawing Sheets

SYSTEM FOR JOINING ELEMENTS TO COMPLEX JUNCTIONS AND LINKS IN ROAD NETWORK REPRESENTATION FOR VEHICLES

BACKGROUND OF THE INVENTION

The invention relates to a method for storing geographical road data in multiple hierarchically organized levels by from a relatively lower level that features detailed representations of road links and junctions, deriving at a relatively globalized level an abstracted representation from such detailed representations. U.S. Pat. No. 4,914,605 describes the representing for display of a road map. Various roads in such road map have a level identifier, highways having a higher level identifier, main roads having a middle level identifier, and secondary roads having a lower level identifier. The number of levels is in principle arbitrary. For visual representation, the display scale is variable. At a big magnification factor, only a small geographical area is displayed, showing all roads therein. At an intermediate magnification factor, a relatively larger geographical area is displayed, showing only roads of the two higher levels therein. At a small magnification factor, a relatively still larger geographical area is displayed, showing only the top level roads therein.

The present inventors have encountered a need for representing not only roads, but also complex intersection patterns between roads in a simplified manner, in such a way that conformance between various representation levels remains guaranteed. Such representation need not necessarily imply visual representation, but may be limited to representing in a data base. On an abstracted level the system will then represent a complex interchange, intersection, fly-over or similar structure as an apparent level crossing, with an appropriate number of links, at a price of giving up some accuracy as to the correct geometry of various elements. For an application requiring detailed decisions the system still retains the correct references to the detailed level. For example, the abstracting operation may shrink a particular loop to a single point, which influences the apparent distance between two geographical positions when the intermediate path would have passed the loop. In fact, calculating a distance with an exact representation will often yield a larger value, than when the abstracted representation is taken at its face. For certain usages, the discrepancy is irrelevant such as for long-distance route planning. For other applications, such as the giving of detailed instructions to a driver on what to do at the nearest intersection, and also for determining the actual position of a vehicle, only an exact representation of the geographical data is sufficient. In first instance, the invention could find application for the invention for highways as well as for roads with a lower classification level.

SUMMARY OF THE INVENTION

Accordingly, amongst other things, it is an object of the present invention to provide a fail-safe method for converting a detailed level representation to a more global one. Now therefore, according to one of its aspects the invention is characterized in that the steps of:

a. at such lower level, joining a set of elementary junctions to a complex junction on the basis of predetermined coherencies among the elementary junctions of the set;

b. repeating step a. until all complex junctions have been found;

c. ascertaining all border elements of one particular set and all elementary external links between those border elements and any element of a particular other set, inclusive of all allowed traffic directions on such elementary external road links, and collectively replacing said elementary external road links by a single complex external road link while mapping said allowed traffic directions thereon;

d. repeating step c. until all complex external road links between sets so paired have been found;

e. representing each remaining elementary junction and each complex junction by a respective single node, while representing each remaining elementary external road link and each complex external road link by a single higher level road link with associated original or mapped traffic directions, respectively.

In this way, a set of elementary junctions are collected to a complex one in a straightforward manner, while also the road links joining two elementary or complex junctions may be joined, thereby diminishing the required storage capacity a great deal. The reduction of stored data allows a faster access which may also be of advantage. In the above, an elementary junction is the interconnecting point between elementary links. These elementary links will be described as being the backbone of the storage organization.

Advantageously, the joining comprises executing successive and looped expanding steps from entrance junctions to follower junctions and exit junctions, and backwards from all exit junctions to preceder junctions and entrance junctions, until detecting an ultimate termination of said expanding, whereby all junctions found in said expanding are comprised in the associated set. An entrance junction will be defined hereinafter; broadly, it represents the first splitting point of a road when nearing a complex junction. Conversely, an exit junction represents the last converging point when leaving a complex junction. An entrance junction preceeds follower junctions (or possibly, an exit junction). An exit junction follows preceder junctions (or possibly, an entrance junction).

The invention also relates to a data processing system for processing and storing data according to the method of the invention, to a storage medium item comprising a stored data structure produced by the method according to the invention, to a reader device for interfacing to such medium item, and to a vehicle provided with such reader. Various further advantageous aspects of the invention are recited in dependent Claims. Earlier work of the present inventor, including a description of multiple level representation of a road network has been published in: Carla Emmerink and Hans Schulte, Route Planning & Route Guidance in the Philips In-Car Navigation System "CARIN", Proc. of the 1st world congress on applications of transport telematics and intelligent vehicle highway systems (Paris, FR, ERTICO Brussels publ.), Volume 1, p. 240–248, 1994.

BRIEF DESCRIPTION OF THE DRAWING

These and other aspects and advantages of the invention will be discussed in detail with reference to disclosure of preferred embodiments hereinafter, and more in particular with reference to the appended Figures that show.

Figures 1A, 1B:
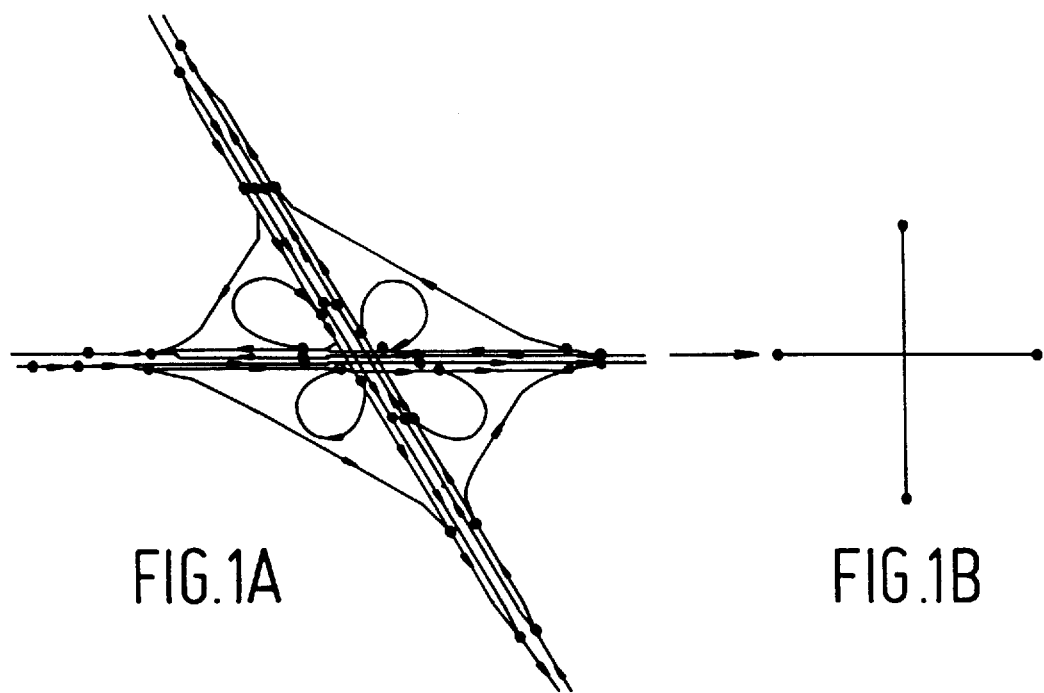
FIGS. 1A, 1B, examples of detailed and abstracted representations, respectively.

Tables 1–3 various aspects of the data structure organization.

GENERAL CONSIDERATIONS

As described in an article by M. L. G. Thoone, CARIN, a car information and navigation system, Philips Technical Review, Vol 43, No. 11/12, December 1987, pp. 317–329, the CARIN system contains an autonomous car navigation system that guides a driver to a destination using a digitized map stored on Compact Disc. The routeplanning function quickly finds an optimum route from an actual vehicle position to a destination. The operating speed of the system is limited by the number of roads that must be examined and by the retrieval speed from Compact Disc to semiconductor foreground memory. As a solution, the map is stored in several versions that all cover the same geographical area, but with different amounts of detail. The versions are based on the road classification that is determined by the functional importance of a particular road. Therefore, each network consists of a subset of the next lower hierarchical network, while suppressing the remainder. The lowest level comprises all roads with a high degree of geometrical accuracy. The highest level network comprises only the most important roads, but with the same degree of accuracy, which accuracy is required by various other functions than the routeplanner function. Therefore, a global network is generated automatically from a more detailed one. The global network in certain aspects may be less accurate, inter alia, through generalization of complex junctions. This is done by reducing a complex multi-node junction to a single node. Also, roads joining those nodes and consisting of two lanes that allow mutually opposite directions of traffic are replaced by a single link allowing bidirectional traffic. In this way less data need be stored on Compact Disc, while also the number of links to be searched in a particular task is much lower.

To generalize the network, the following strategy is followed. First define the complex junctions with the help of geographical attributes in the digital map like street names, type of junction, physical form, and traffic technical properties. Generally, such attributes will represent some form of coherence between the elementary junctions of a complex junction. Replace a complex junction by a single node. Next, find the roads that connect a particular complex junction to another particular complex junction. If only one road, the external road link retains its identity. If more than one road, replace them collectively by a single complex external road; if the original roads together allow traffic in either direction, such as by having two lanes with opposite directions of traffic flow, the complex link is open for traffic in both directions. When it is not possible to turn at the junction from one external connecting road to another external connecting road, attach a turn restriction to the replacing complex junction that prohibits the associated turn. Define the length of the new link by adding the average length of the original link and the size of the node representing the complex junction. Finally, define the connections with the other networks at the nodes of the links which are going to or leaving from the complex junction in question.

After simplifying the lowest level network, much information will remain because in general only the important roads give rise to complex junctions. These roads represent only a small fraction of the total number of roads at the lowest level. Now, in case the lowest level network is used not only by the route planner, but also by other functions in the vehicle that need high accuracy, both the globalized level and the local level of the network are retained.

DETAILED DESCRIPTION OF PREFERRED EMBODIMENTS

FIGS. 1A, 1B are a first example of detailed and abstracted representations respectively, of a so-called 'clover-leaf' crossing between two main roads. First, the detailed representation of FIG. 1A is considered. Far away from the actual intersection point, the two roads for each direction consist of lanes that allow interchanging, and are represented by single lines. Upon nearing the actual intersection, as from a certain point (entrance junction) indicated by a dot, the driver must choose between central lanes and lateral lanes, each category being indicated by a separate line. The lateral lanes allow for branching off, the central lines do not. Still nearer to the centre of gravity of the actual intersection, the driver may first choose between branching off to the right (second dot) and branching off to the left (fourth dot). Each of these two have their counterpart for joining traffic (fifth and third dot, respectively, when no branching off is effected). Finally, the lateral lanes join the central lanes again (sixth dot that represents an exit junction).

FIG. 1B is the abstracted representation of the same crossing. The crossing proper is now represented as a single dot. The crossing dot terminates four roads shown as single lines. Each of the roads has a qualifier 'bidirectional'. The crossing has a complex qualifier indicating that each feeder road allows leaving through each one of the other three roads. As a further simplification, the intersecting angle of the two roads is represented in a standard manner, in this case as an intersection at 90 degrees. In another realization, this angle may be different and more conform with reality. A complex link between crossings may be represented as a straight line, or as a sequence of more than one straight line.

Figures 2A, 2B:
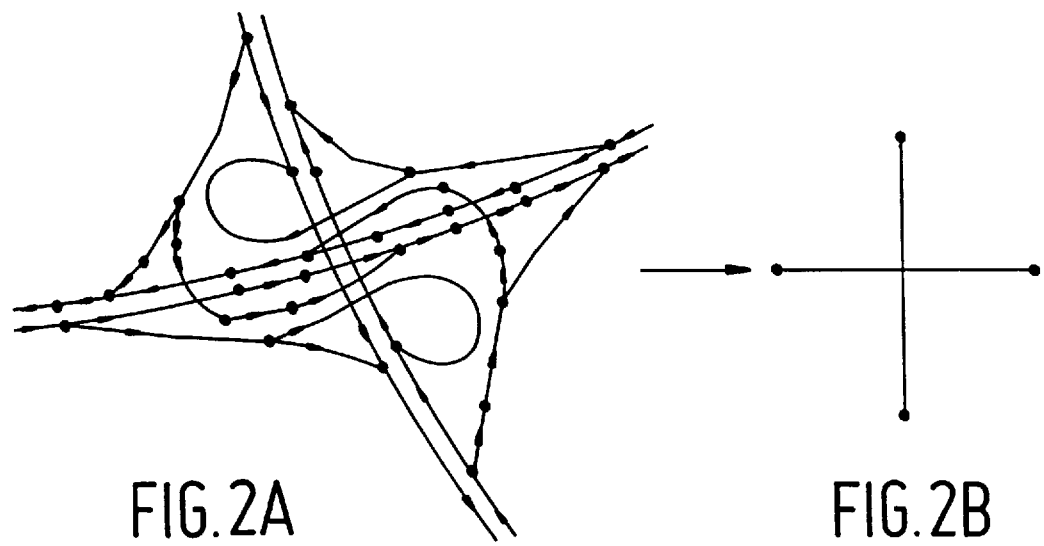
FIGS. 2A, 2B, a second example thereof.

FIGS. 2A, 2B are a second example of detailed and abstracted representations, respectively. In fact, this road pattern allows exactly the same choices as FIG. 1A. This means that the abstracted representation in FIG. 2B is identical to that of FIG. 1B. However, the sequence of selecting is different, and in consequence, detailed indications to a driver are different from those in FIG. 1A.

Figures 3A, 3B:
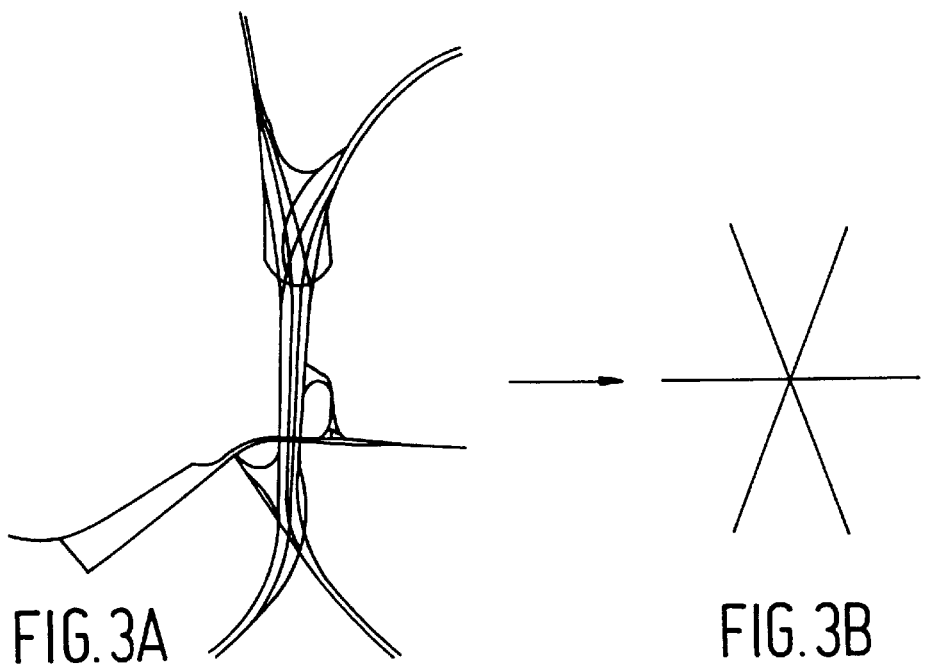
FIGS. 3A, 3B, a third example thereof.

FIGS. 3A, 3B are a third example of detailed and abstracted representations respectively, of a rather more complicated intersection pattern. For simplicity, various multilevel crossings have been shown in an elementary manner only. From cursory viewing it is clear that instructions may often go 'against the driver's intuition'. This is even more true inasmuch as the possible dimensional variation among such complex configurations is relatively wide, so that no standard "image" in the driver's mind pertains to them. The abstracted representation in FIG. 3B looks like three intersecting straight roads at standardized intersecting angles. Again, all roads as well as the crossing itself have adequate qualifiers not shown in the Figure.

Figure 4:
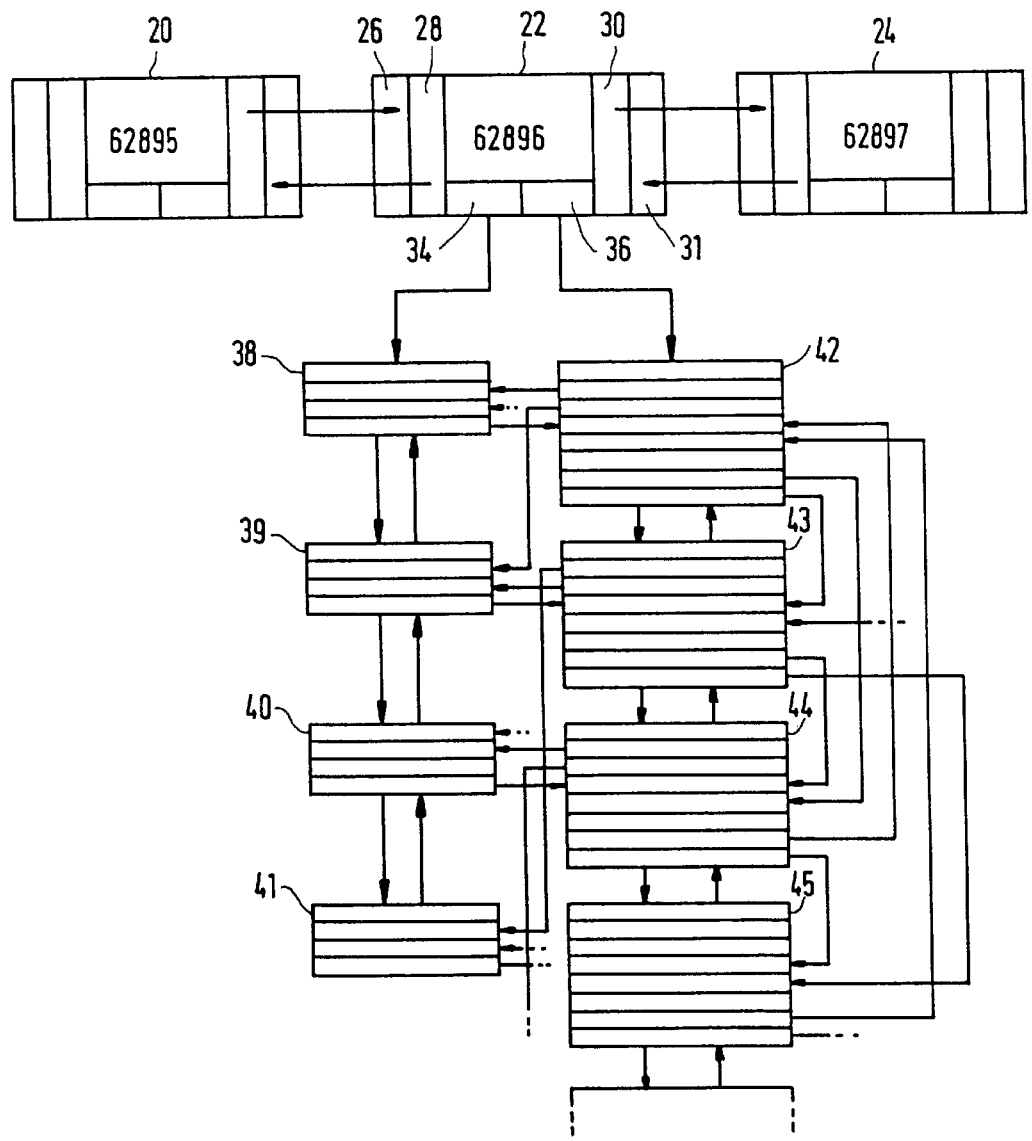
FIG. 4, a schematic of the data structure.

FIG. 4 is a schematic of the data structure. For detailed disclosure thereof, reference is had to EP 302 547, corresponding to U.S. Pat. No. 4,954,986, EP 306 075, corresponding to U.S. Pat. No. 4,962,458 and to EP 479 364, corresponding to United States patent application Ser. No. 07/769,613, now U.S. Pat. No. 5,754,846, all to the same assignee as the present application and being herein incorporated by reference. The backbone element of the data structure is the link (also called chain) that interconnects two junctions or nodes. For each of the two nodes, the link has a thread pointer that systematically points to the next-following link terminating on the node in question. The sequence of the links is uniformly clockwise. If the sequence would pass the boundary of a so-called bucket, there is a dummy thread pointer instead. A bucket is a standard-size data unit that may cover a geographical area of arbitrary size. Appropriate bucket-to-bucket referencing allows for quick transfer during a search in the data structure. For the exact definitions of node, link and thread pointer, reference is had to the citations. A link or chain furthermore contains an information of its class, such as highway, secondary road, etcetera, the allowed direction of traffic, and its length. Further optional data items are feasible.

Now in FIG. 4, three numbered buckets 20, 22, 24 are shown as being incorporated in a doubly linked chain. Details have only been given with respect to bucket 22. First, a bucket has an organizer part 32, that contains an identifier of the bucket in question, refers to all physically adjacent buckets on the level in question, and also refers to the logically adjacent buckets 20, 24 in the chain. The physically adjacent buckets are referred to by number; note that the geographical size of a bucket is non-uniform on any single level, and also non-uniform between the various levels. The formation of the bucket has been considered as state of the art. Thus, bucket item 28 refers back to the predecessor bucket and is paired with item 26 that is the referral target of the predecessor bucket, item 30 refers forward to the successor bucket and is paired with item 31 that is the referral target of the successor bucket. The organizer has a referral part to the link structure 42–45, and to the node structure 38–41. As shown, the two latter data structures are again constituted by a doubly linked chain. Each block 42–45 represents one link, each block 38–41 represents one node.

As stated, a chain or link in the chain data structure, by means of a thread pointer refers at each of its terminating nodes to at most one other chain. A selection of these referrals have been shown at the right edge of the link data structure. Furthermore, each link refers to its terminating nodes that are stored in the node data structure 38–41. A selection of these referrals has been represented by arrows from the link data structure to the node data structure. Finally, each node refers to a single chain terminating at the node in question, the chain having been chosen in a systematical manner. A selection of these referrals has been represented by arrows from the node data structure to the chain data structure. This organization allows for an advantageous trade-off between minimal storage requirements and maximum searching speed. The referrals have been shown by way of example only.

In this context, Tables 1–3 give various aspects of the data structure organization. Table 1 gives the data base entry of the bucket in the bucket_list, containing a bucket identifier, the referrals to neighbouring buckets, and to the node list and chain list. Table 2 gives the data base entry of the node in the node_list, containing a node identifier, the geographical coordinates, one referral to the neighbouring chain list, and referrals to the neighbouring nodes. Table 3 gives the data base entry of the chain in the chain_list, containing a validity indicator, a chain identifier, referrals to the terminating nodes, two thread pointer referrals, the length of the chain, a referral to a (complex) junction, a traffic direction indicator, a road class indicator, a form of way indicator, a street name, a turn restriction indicator, and referrals to the neighbouring chains.

Figure 5:
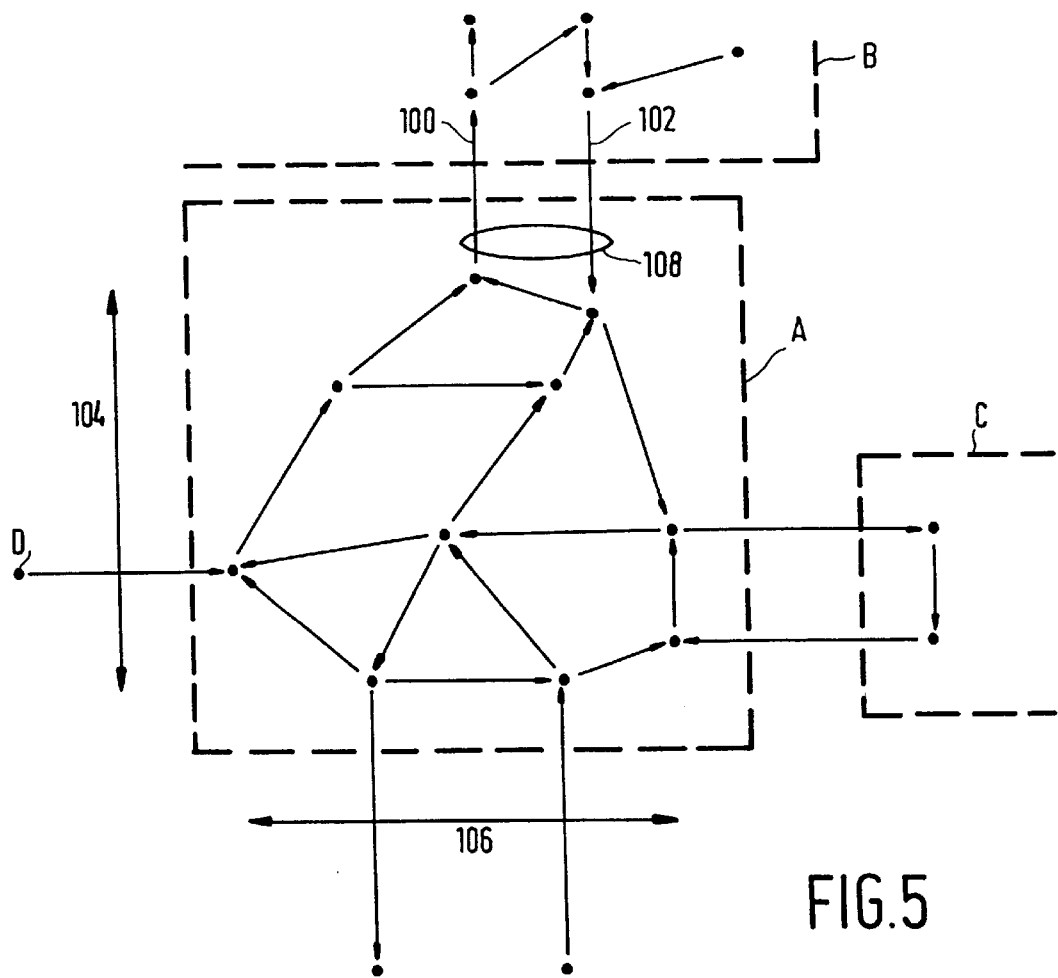
FIG. 5, a diagram of various elementary junctions.

FIG. 5 is a diagram of various elementary junctions. These junctions have been found in the manner explained in the disclosure with reference to FIG. 6, and have each been shown as a dot, and provided with all elementary links interconnecting the junctions. The geography has been represented by way of example only. Ten of the elementary junctions have been joined into a set labelled A. Seven others have been joined into sets B and C, respectively. A single junction D has not been joined. Sets A and B are interconnected by elementary external road links 100, 102, that in this manner each interconnect two border junctions of the sets in question. In the abstracting, the sets A, B, and C are each represented by a single complex junction. In so doing, also the elementary road links 100, 102 are mapped onto a single complex external road link, as being symbolically indicated by loop 108. As shown, the two links 100, 102 have mutually opposite traffic directions. This means that in the joining, the complex road junction can get a bidirectional traffic indication. On the other hand, all elementary road links interconnecting another pair of sets of elementary junctions can have the same traffic directions. This means that the joined complex road junction will also have a one-directional traffic indication. This case has not been shown in the Figure. The road junction between set A and node D keeps its one-directional traffic indication. The example here has only elementary links with a single traffic direction. However, in certain cases, also certain elementary road links may have a bidirectional traffic direction. This may influence the ultimate labelling of the complex external road links. A further complication may be that certain elementary road links are blocked for particular traffic categories, such as for heavy trucks: this may translate to a traffic direction indicator having three or even more values. This again may influence the labelling of the complex external road links. Both of the latter situations have been ignored in FIG. 5.

In the abstracted representation, now the distance between the complex junctions must be reproduced. The most simple solution is to ignore the size of the area covered by a complex junction. Although computationally attractive, this implies the underrating of distances, sometimes by a significant amount. The next level of refinement is the following. First the width (106) and the height (104) of a complex junction are found as the horizontal and vertical distances, respectively, between the farthest apart elementary junctions. The data base according to the above Table 2 allows for easy computation thereof. The average value of these is taken as the apparent diameter of the complex junction that is assumed to cover a circular area. One half of this value is added to the length of all single or complex road junctions on the next higher level. Further refinements would take into account that the set of elementary junctions could cover a somewhat elliptical area. For a link between two complex junctions, the increment would occur at both extremities of the link in question.

A further problem occurs if certain paths between external links to a complex junction are inhibited, in that no such elementary link path within the set of elementary junctions exists. In that case, this is detected in that no viable path interconnects any elementary input road link to be joined into a first complex external road link to any elementary output road link of a second complex external road link (or likewise, going in the other direction). Upon representing the complex junction by a single node, an inhibiting qualifier is retained for the associated higher level road link pair of the associated complex junction. For example, there is no viable path from set B to node node D. In a simple version this may be translated as "right turn inhibited" on the complex road link 108. Such a situation may occur in certain circumstances even when the traffic directions on the external links would match in principle. For example, if no viable path between node D and external road link 102 were present, the incoming road link from node D would get a qualifier "left turn inhibited".

Figure 6:
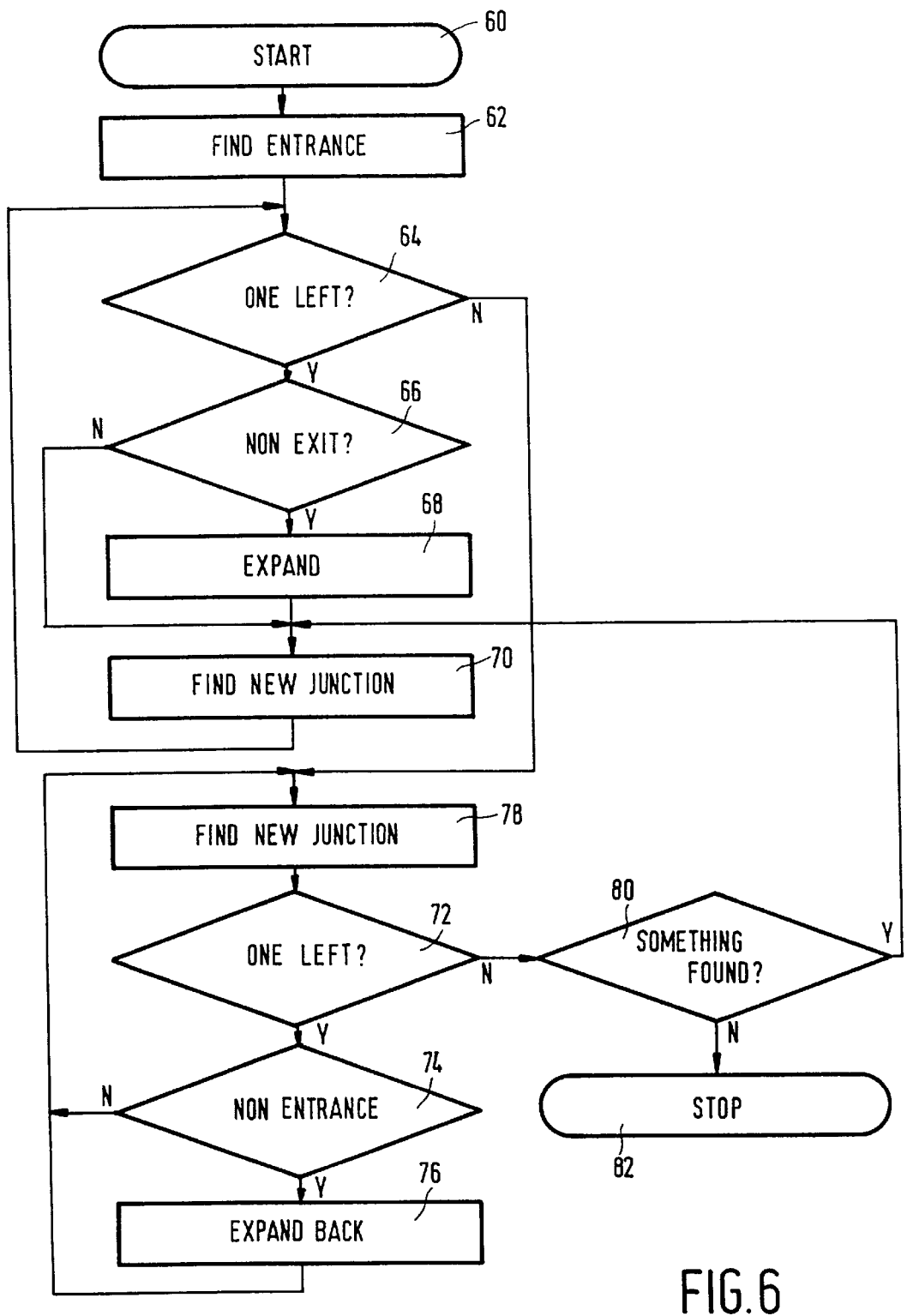
FIG. 6, a flow chart of the method of the invention.

FIG. 6 is a flow chart of the method of the invention for finding and abstracting a complex junction. In block 60, the system is initialized by loading the necessary data from the lower level detailed representation of the network. In block 62 an elementary junction is loaded, and detected as being a so-called entrance junction. Candidates come in two varieties. A first type of entrance junction is a so-called split that has one link which allows traffic coming towards the node, and has at least two other chains that allow traffic to move away from the node. A second type of entrance junction is an elementary junction that connects at least three chains that each allow bidirectional traffic; clearly, the second category of entrance junction can be expressed as a sub-category of the first. As an extra condition for an entrance junction, at least one chain allowing incoming traffic should have a minimum length measured to the preceding junction, such as in the region between 900 and 1200 meters. The setting of this value depends on the character of the road network. If too large, a complex junction of too broad span could result that would mask functional routes or even render whole complex junctions invisible. If too small, the joining could remain incomplete, in that the complex would only reduce to several complex sub-junctions.

A third condition to the finding of an entrance is that one of the outgoing chains should be marked as "exit". By itself, the 'exit junction' is defined in the reverse manner from the entrance junction. Now, a first exception to the third condition is when a highway directly connects to a non-highway; this situation is however recognized correctly when the link in question has been coded in this particular category. A second exception thereto is when an elemental split occurs, and the chain length up to the next elemental split or elemental joining of links is less than a further distance, that may be in the region between 1800 and 2300 meters, again depending on the character of the network. This second exception allows to include splits in the set of nodes pertaining to a complex junction. The recognizing of entrance junctions goes on until all junctions have been considered. The looping has only been drawn in an overall manner.

Now, if such entrance junction has been found, it is used as a starting point for identifying a complex junction. Any link thereto is listed and stored, and one thereof, which has not been considered earlier, is accessed (64). The other terminal node thereof is now taken as the new starting point, provided that is has not yet been considered in the search. If the new node is a non-exit junction (66), the process is repeated. If the new node however is an exit junction, the data of the path followed thereto is stored, and the most recently stored node is accessed for treatment in the above manner (70). If no further expanding in the direction of the exit junctions is possible (64), the system goes to the lower half of the Figure.

An exit junction is ascertained in similar way to an entrance junction, by inverting the directions of allowed traffic; the conditions mirror those of the entrance junctions. The processing of entrance junctions and any junction derived therefrom proceeds as explained supra, until no further unprocessed elementary junctions remain that could be found to be an entrance junction.

Next, expanding from the exit junctions so found is executed in a manner corresponding to the one described hereabove, the only difference being the direction along the links, and the halting if a new entrance is found. The accessing goes on until no further potential exit junctions found in the upper half of the Figure remain. Again, new entrance junctions can be found. These new entrance nodes are again processed in the manner described supra for the first entrance junction in the upper half of the Figure. The process so alternates between searching for entrance junctions and searching for exit junctions. The method terminates (82) if no new junction has been found (80). Then the method is ready for the next complex junction in question by starting from a new entrance junction that has not yet been considered. For finding all complex junctions, all elementary junctions in the total set must be accessed at least once to see whether they are initial entrance junctions.

Now all nodes within a particular set of nodes are ascertained as to whether they are border nodes: this are nodes that are connected to an elementary junction outside the set in question, or to another set of elementary junctions. First, if two or more nodes in a set are connected to the same other set of nodes, the allowed traffic directions on the intermediate links are ascertained, and the intermediate external road links are joined to a complex external road link. The latter link gets all the allowed traffic directions on the elementary links between the two sets. If applicable, a similar procedure is effected on the links between a set of elementary junctions now joined, and a single further elementary junction that is not linked into a complex junction.

FIG. 6 is the flow chart of the method of the invention for finding and abstracting a complex junction. The various blocks are labelled as follows.

60 START: loading.
62 FIND ENTRANCE JUNCTION, by just accessing all junctions once that have not been accessed yet.
64 ONE LEFT, detect whether the bucket of unprocessed junctions of the set contains at least one junction; when coming from 62, this is the one found there.
66 NON-EXIT? detect whether the present junction is a follower or exit junction; when coming from 62, this is a dummy question answered always with yes.
68 EXPAND if positive in 68 and store other junctions connected to the new follower junction in the bucket
70 FIND NEW JUNCTION from the bucket, either after expanding or directly from 66 if negative.

If negative in 64, the bucket is sought for non-entrance or preceder junctions in the same configuration (72, 74, 76, 78) as the search for follower junctions. If negative in 72, go to 80. If positive in 80, go to 70. Usually, a complex junction needs only one traversal from the upper half to the lower half in FIG. 6.

80 SOMETHING FOUND, either a new follower junction in the upper half, or a new preceder junction in the lower half of the Figure. If negative, all elementary junctions of the complex junction have now been found, and the process terminates:
82 STOP. However, if positive, the system goes back to block 70. Other complex junctions than the single one in question have not been considered in the Figure.

The above treatment may be combined with processing on the basis of the junction qualifier in the chain_list recited with respect to Table 3. For example, such qualifier may indicate that the elementary link in question is part of a round-about junction. This allows first to abstract such round-about junctions in a simple manner to a complex junction that may be represented in an abstracted manner for fast accessing or easy display. Moreover, it allows to join the round-about with even more nearby elementary junctions to a higher level complex junction. In similar manner, coherency of elementary junctions may be dictated by their mutual closeness alone; certain countermeasures may be required then for avoiding the representation of bigger towns by just a single complex junction. For example, the total size of a set of elementary junctions may have an upper boundary, either in number of elementary junctions, or in distance across the set.

Figure 7:
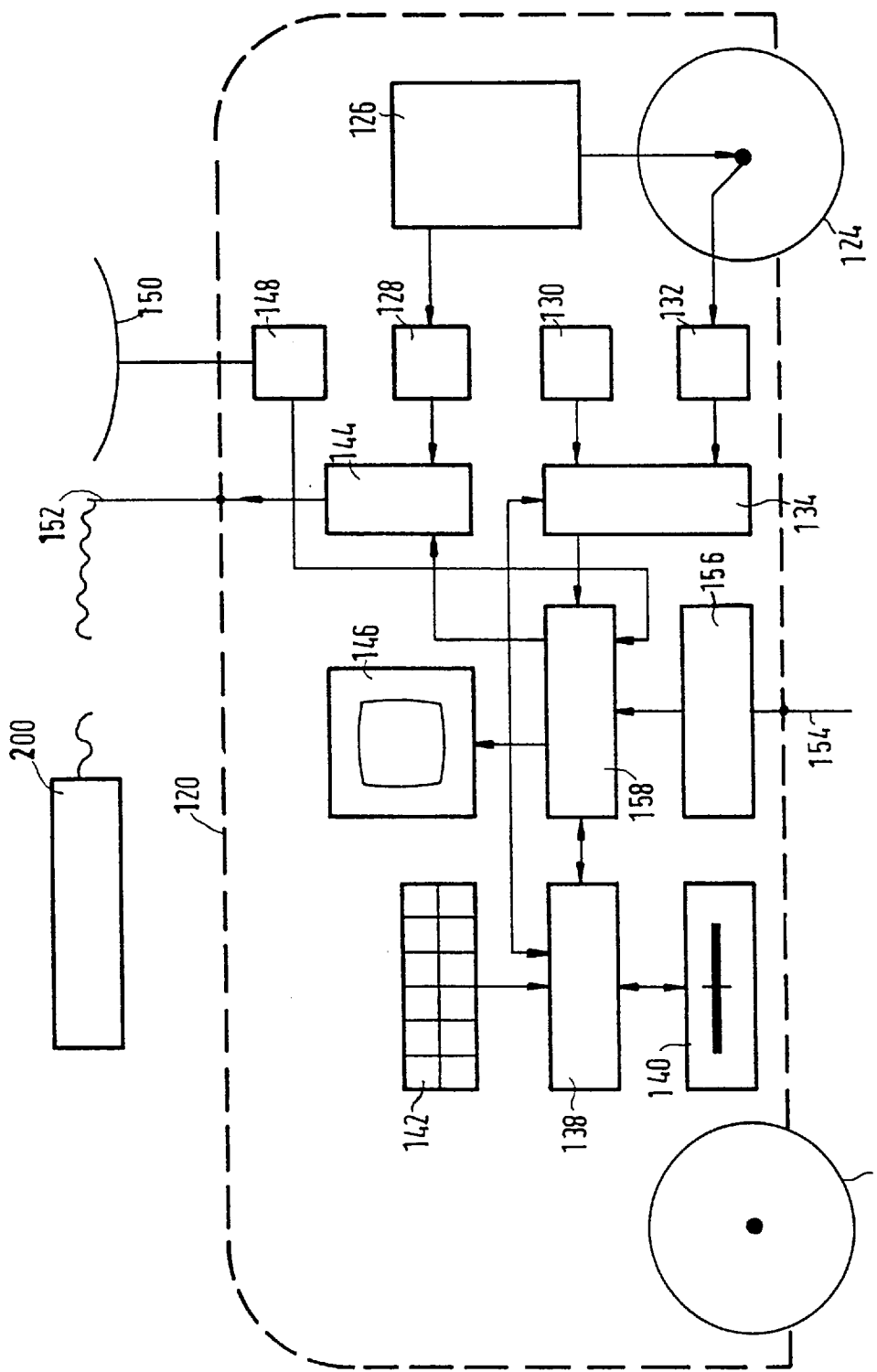
FIG. 7, a vehicle with a navigation system according to the invention.

FIG. 7 shows a vehicle with a navigation system according to the invention that has been shown in a very schematic way only. The car has a body 120, front wheels 122, and rear wheels 124 that are driven by a combination of motor and gearbox 126. For simplicity, the user interface to the motor and other mechanical controllables of the car have not been shown. The car as shown has various systems for determining its actual position. First, there is a compass 130. Second, there is an odometer combination 132, that may have a separate odometer on each one of a wheel pair. In the Figure, this has been shown for the rear, driven wheels, but in practice, usually the non-driven wheels are chosen. The average displacement signalled by the two odometers in combination with the compass reading gives the distance and direction travelled. The difference between the two odometer readings is used to calculate turns, which in combination with the compass may produce corrections and/or calibrations to the distance travelled. These and other calculations are effected in processor 134. By itself the necessary mathematical calculations may be conventional.

A second position determining system has disk antenna 150 that receives wave patterns from various GPS satellites, from which wave patterns in processor 148 an actual position is calculated. A third position determining system has antenna 154 that receives location codes from roadside beacons that have a limited transmission range. Through recognition of the codes, in processor 156 the actual position is ascertained.

Block 140 is a CD-ROM player that contains a random accessible optical disk with geographical data, inclusive of the data base acquired as recited hereabove. This data base can for various purposes be accessed by routeplanner processor 138 under selective control from user interface 142 that contains a number of actuatable keys. Inputting of a starting position and of a destination activates access of appropriate map data from player 140. Therefrom processor 138 calculates an optimum route, an expected time of arrival. Processor 158 combines the position data produced by processors 134 (sensor determined), 148 (GPS determined) and 156 (through beacon signals), as far as appropriate, accesses the geographical data from player 140 that are relevant to the preliminary actual position as calculated and maps these on the actual map. A dead-reckoning operation maps the calculated preliminary position on the most probable actual road position, when off-road motion may be ignored. Actual position and planned route in the neighbourhood of the actual position can be displayed on display element 146 in map form. Other data relevant to the driver may be displayed as well, such as actual time, expected time of arrival, instantaneous guidance indications such as arrows, and destination.

In practice, not all three position data generation mechanisms will be necessary. For example, the GPS system may by itself be sufficient if obstacles such as highrise buildings are sufficiently rare and the GPS accuracy is good. In practice, the CD-ROM support is however necessary, for avoiding drift arising from inaccurate sensors or bridging temporary failure of the other methods. The routeplanning may be foregone in certain realizations of the present invention.

Block 128 can detect a discrete internal change of status of the vehicle, such as starting or stopping of the vehicle. Other internal changes of status of the vehicle as pertaining to the navigation can be detected in the central processor 158. This processor is connected to the transmitter-receiver 144, to the routeplanning processor 38, and also to the position determining processors 134 and 156. An example of such other is that a predetermined distance has been covered.

Block 144 is a transmitter-receiver for a cellular broadcast system which has a limited range. Element 152 is the associated antenna. Detection of an internal change of status detected by either element 128 or central processor 158 incite the central processor to cause transmission of the actual position by transmitter-receiver 144. The actual position is then formatted and via antenna 152 broadcast to the central station 200. The vehicle as described has been disclosed more in detail in U.S. application Ser. No. 08/433, 669, now U.S. Pat. No. 5,598,167, corresponding to EP 959915293.5 (PHN 14.843) assigned to the present assignee.

ANNEX

TABLE 1

```
struct BUCKET_LIST { /* Double linked list of buckets */
        long                    buck_id;
        struct BUCKET_LIST      *previous;
        struct CHAIN_LIST       *chain_list;
        struct NODE_LIST        *node_list;
        struct BUCKET_LIST      *next;
        };
```

TABLE 2

```
struct NODE_LIST { /* List of nodes */
        struct GEO_COORD        *coordinates;
        struct CHAIN_LIST       *adjacent_chain;
        struct NODE_LIST        *previous;
        struct NODE_LIST        *next;
        };
```

TABLE 3

```
struct CHAIN_LIST { /* List of chains */
        int                        chain_valid;
        struct IDENTIFICATION      *chain_id;
        struct NODE_LIST           *node_A;
        struct NODE_LIST           *node_B;
        struct CHAIN_LIST          *next_A_chain;
        struct CHAIN_LIST          *next_B_chain;
        USHORT                     chain_length;
        USHORT                     part_of_junction;
        USHORT                     direction_of_traffic_flow;
        USHORT                     road_class;
        USHORT                     form_of_way;
        char                       *street_name;
        struct RESTRICTED_CHAIN_LIST *turn_rest;
        struct CHAIN_LIST          *previous;
        struct CHAIN_LIST          *next;
        };
```

We claim:

1. A method for storing geographical road data in multiple hierarchically organized levels by from a relatively lower level that features detailed representations of road links and junctions, deriving at a relatively globalized level an abstracted representation from such detailed representations, characterized by the steps of:

a. at such lower level, joining a set of elementary junctions to a complex junction on the basis of predetermined coherencies among the elementary junctions of the set;

b. repeating step a. until all complex junctions have been found;

c. ascertaining all border elements of a particular set and all elementary external links between those border elements and any element of one particular other set, inclusive of all allowed traffic directions on such elementary external road links, and collectively replacing said elementary external road links by a single complex external road link while mapping said allowed traffic directions thereon;

d. repeating step c. until all complex external road links between sets so paired have been found;

e. representing each remaining elementary junction and each complex junction by a respective single node, while representing each remaining elementary external road link and each complex external road link by a single higher level road link with associated original or mapped traffic directions, respectively.

2. A method as claimed in claim 1, wherein each single higher level road link is represented by a straight line.

3. A method as claimed in claim 2, wherein said representing is effected on a visual display.

4. A method as claimed in claim 3, wherein said ascertaining with respect to a particular complex junction comprises searching in the associated set of elementary junctions for an allowable traffic path that connects an ingoing allowed traffic direction on a first higher level road link to an outgoing allowed traffic direction on a second higher level road link, but if disallowed retaining an inhibiting qualifier for the associated higher level road link pair of the associated complex junction.

5. A method as claimed in claim 4, wherein the length of a higher level complex road link is set to an average length of the associated elementary road links plus a size value of one or both sets of elementary junctions interconnected thereby.

6. A method as claimed in claim 5, wherein said joining comprises executing successive and looped expanding steps from entrance junctions to follower junctions and exit junctions, and backwards from all exit junctions to preceder junctions and entrance junctions, until detecting an ultimate termination of said expanding, whereby all junctions found in said expanding are comprised in the associated set.

7. A storage medium item comprising a stored data structure produced by executing the method as claimed in claim 6.

8. A reader device for interfacing to a storage medium as claimed in claim 7, and comprising access means for selectively accessing said stored data structure for therefrom extracting information pertaining to a plurality of said complex junctions and complex external road links.

9. A reader as claimed in claim 8 and having display means for selectively displaying said complex junctions and complex external road links.

10. A vehicle comprising a navigational system including a reader device as claimed in claim 9.

11. A vehicle comprising a navigational system including a reader device as claimed in claim 8.

12. A method as claimed in claim 2, wherein said ascertaining with respect to a particular complex junction comprises searching in the associated set of elementary junctions for an allowable traffic path that connects an ingoing allowed traffic direction on a first higher level road link to an outgoing allowed traffic direction on a second higher level road link, but if disallowed retaining an inhibiting qualifier for the associated higher level road link pair of the associated complex junction.

13. A method as claimed in claim 1, wherein said representing is effected on a visual display.

14. A method as claimed in claim 1, wherein said ascertaining with respect to a particular complex junction comprises searching in the associated set of elementary junctions for an allowable traffic path that connects an ingoing allowed traffic direction on a first higher level road link to an outgoing allowed traffic direction on a second higher level road link, but if disallowed retaining an inhibiting qualifier for the associated higher level road link pair of the associated complex junction.

15. A method as claimed in claim 1, wherein the length of a higher level complex road link is set to an average length of the associated elementary road links plus a size value of one or both sets of elementary junctions interconnected thereby.

16. A method as claimed in claim 1, wherein said joining comprises executing successive and looped expanding steps from entrance junctions to follower junctions and exit junctions, and backwards from all exit junctions to preceder junctions and entrance junctions, until detecting an ultimate termination of said expanding, whereby all junctions found in said expanding are comprised in the associated set.

17. A storage medium item comprising a stored data structure produced by executing the method as claimed in claim 1.

18. A data processing system for processing and storing geographical road data in multiple hierarchically organized levels by from a relatively lower level that features detailed representations of road links and junctions, deriving at a relatively globalized level an abstracted representation from such detailed representations, said system comprising:

a. joining means for, at such lower level, joining a set of elementary junctions to a complex junction on the basis of predetermined coherencies among the elementary junctions of the set;

b. first sequencer means for cyclically activating the joining means of item a. until all complex junctions have been found;

c. ascertaining means for ascertaining all border elements of a particular set and all elementary external links between those border elements and any element of a particular other set, inclusive of all allowed traffic directions on such elementary external road links, and collectively replacing said elementary external road links by a single complex external road link while mapping said allowed traffic directions thereon;

d. second sequencer means for cyclically activating the ascertaining means of item c. until all complex external road links between sets so paired have been found;

e. representing means for representing each remaining elementary junction and each complex junction by a respective single node, while representing each remaining elementary external road link and each complex external road link by a single higher level road link with associated original or mapped traffic directions, respectively.

* * * * *